United States Patent [19]

Kämper

[11] Patent Number: 5,271,606
[45] Date of Patent: Dec. 21, 1993

[54] TENSIONING RATCHET FOR A LASHING STRAP

[75] Inventor: Hans-Werner Kämper, Würselen, Fed. Rep. of Germany

[73] Assignee: Spanset Inter AG, Oetwil am See, Switzerland

[21] Appl. No.: 654,634

[22] PCT Filed: Jun. 19, 1990

[86] PCT No.: PCT/DE90/00459
§ 371 Date: Feb. 19, 1991
§ 102(e) Date: Feb. 19, 1991

[87] PCT Pub. No.: WO90/15731
PCT Pub. Date: Dec. 27, 1990

[30] Foreign Application Priority Data

Jun. 19, 1989 [DE] Fed. Rep. of Germany ... 8907460[U]

[51] Int. Cl.$^5$ ............................................. B60P 7/08
[52] U.S. Cl. ............................................. 254/217
[58] Field of Search ................ 254/217, 213, 223, 218

[56] References Cited

U.S. PATENT DOCUMENTS

| 2,506,705 | 5/1950 | Coffing | 254/369 |
|---|---|---|---|
| 2,889,136 | 6/1959 | Prete, Jr. | 254/218 |
| 3,348,812 | 10/1967 | Story | 254/223 |
| 4,199,182 | 9/1980 | Sunessow . | |
| 4,227,286 | 10/1980 | Holmberg | 254/218 |
| 4,475,854 | 10/1984 | Ericsson | 254/223 |
| 4,510,651 | 4/1985 | Prete, Jr. et al. | 254/217 |
| 4,542,883 | 9/1985 | Rutzki | 254/223 |
| 4,860,606 | 8/1989 | Rousseau . | |

FOREIGN PATENT DOCUMENTS

| 2845227 | 5/1979 | Fed. Rep. of Germany . | |
|---|---|---|---|
| 2236774 | 2/1975 | France . | |
| 89/08603 | 9/1989 | World Int. Prop. O. | 254/217 |

OTHER PUBLICATIONS

Brockhaus Enzyklopädie; Siebzehnter Band Schr-Stal, Wiesbaden, 1973.

Primary Examiner—Katherine Matecki
Attorney, Agent, or Firm—Spencer, Frank & Schneider

[57] ABSTRACT

A tensioning apparatus for a lashing strap (8) includes a frame (1) having side walls (5, 5'). One end of the lashing strap (8) is fixed to the frame. A spindle (11) is rotatably secured to the frame (1), bridging the space between the side walls (5, 5') and bearing a tensioning lever (17) for winding the lashing strap (8) up from its free end. Ratchet devices that are employed at either end of the spindle (11) permit the operator to select whether a push or a pull on the tensioning lever (17) is to turn the spindle (11). Each ratchet device includes a ratchet wheel (14; 14') fixed to the spindle (11), a ratchet securing mechanism (70) disposed at the frame (1), and a tensioning ratchet mechanism (80) disposed at the tensioning lever (17).

31 Claims, 8 Drawing Sheets

TENSIONING RATCHET FOR A LASHING STRAP

BACKGROUND OF THE INVENTION

The invention relates to a tensioning apparatus for a lashing strap. More particularly, the invention relates to a tensioning apparatus of the type that includes a frame for fixing one end of the lashing strap between its side walls, a spindle supporting a tensioning lever that is fixable so as to be secured against rotation for winding up the lashing strap from its other end, the spindle being rotatably mounted on the frame so as to bridge the space between its side walls, and a ratchet securing mechanism effective between the frame and the spindle for securing against rotation in the opposite direction the rotary position attained on the basis of the operation of the tensioning lever. A tensioning apparatus of this type is disclosed, for example, in German Patent 2,895,227.C2.

Such tensioning apparatuses serve as tensioning and tie-down devices for actual straps, with lashing straps constituting a preferred embodiment of the tensioning and tie-down means, which may also be in the form of chains, steel cables, ropes or the like. With such lashing straps, goods to be transported are charged with the necessary lashing tension to secure their position on transporting aids or transporting means, for example the beds of trucks.

For this purpose, a tensioning apparatus of the above-mentioned type is customarily provided with a frame which serves as the basic body and which may be fixed to the load-carrying surface. Usually, however, the frame housing is configured as a strap holding arm in such a manner that the fixed end of the lashing strap is fixed to a free end of the frame, for example by means of a holding pin, while at the same time a spindle that is coupled with a ratchet device is provided at the opposite free end of the frame. Such ratchet mechanisms are generally known (see Brockhaus Enzyklopädie [Brockhaus Encyclopedia], 17th Edition, Volume 17, page 714, published by Brockhaus, Wiesbaden, 1973.

After encircling the load to be secured, the loose end of the lashing strap is pulled through a slot, which usually passes through the wind-up spindle diametrally and over its entire length, as far as this is possible without resistance. Then the wind-up spindle is rotated by pivoting a tensioning lever back and forth. The tensioning lever drives an externally toothed ratchet wheel of the ratchet device in the tensioning direction of the wind-up spindle, so that the lashing strap is wound around the wind-up spindle which acts in the manner of a wind-up reel and is thus charged with an increasing lashing tension.

The conventional tensioning apparatuses are constructed in such a manner that, in the rest state and in the final load securing state, respectively, the tensioning lever takes on a position in which it is parallel to the frame. In order to tension the lashing strap, that is to generate the necessary torque to be transferred to the wind-up spindle, the tensioning lever is pivoted away from the frame until the frame and the tensioning lever form approximately a 90° angle whose apex lies approximately in the center axis of the wind-up spindle The lashing strap is tensioned as described above by a back-and-forth movement of the tensioning lever between the rest position and the 90° position. For this purpose, the teeth of the ratchet wheel are provided with mutually asymmetrical flanks and are oriented in such a manner that a catch that is displaceable at the pivot arm lockingly engages in the teeth in one pivoting direction of the pivot arm and, by its pivoting movement, turns the ratchet wheel together with the wind-up spindle that is kinematically coupled with it in the tensioning direction (load stroke), while in the opposite pivoting direction, the catch slides over the usually rounded rear flanks of the teeth (no-load stroke). Consequently, the back and forth movement of the pivot lever is always composed of a load stroke and a no-load stroke. If the load stroke is effected by pulling the tensioning lever to perform a pivoting movement from the 90° position toward the frame into the rest position, one speaks of a pull ratchet. If, however, the load stroke is effected by pushing the tensioning lever from the rest position into the 90° position away from the frame housing, one speaks of a push ratchet.

The major drawback of being able to tension such pull and push ratchets in only one direction is evident. Another drawback in connection with permanently mounted tensioning apparatuses is that they may be mounted in an ergonomically favorable manner for right-handed operators but not for left-handed operators.

For the use of such tensioning ratchets it has been found to be useful for the operator lean on the tensioning lever of the apparatus so as to use the resulting force of his body weight to transfer the necessary torque by way of the tensioning lever to the tensioning apparatus. Consequently, the one-sidedness of the direction of rotation of the tensioning apparatus may be a drawback depending on the momentary position of the operator relative to the apparatus.

Another drawback is that it is necessary right from the start, when a tensioning apparatus is initially acquired, to settle on a certain tensioning direction. Moreover, care must always be taken, when tying down the load to be secured, to consider which final position the apparatus will ultimately take up.

SUMMARY OF THE INVENTION

It is therefore the object of the invention to provide a tensioning apparatus of such configuration that the driving torque required to tension the lashing strap, produced by pivoting the tensioning lever to turn the wind-up spindle, can be generated easily from a work physiology point of view.

This is accomplished by providing a tensioning apparatus which is characterized in that the locking direction of the ratchet securing mechanism is switchable.

The invention is based on the idea that for the generation of the driving torque it is immaterial in principle and left to the discretion of the operator, in which of the two possible directions of rotation the wind-up spindle is rotated, that is, the lashing strap is wound up. What is important, however, is the freedom to select this direction as a function of the momentary position of the operator relative to the tensioning apparatus; that is, whether the torque is to be generated by a load stroke in the manner of a pull ratchet or a push ratchet. Whichever tensioning direction of the tensioning lever is better for the operator from a work-physiology standpoint has priority. Advantageously, the operator is able to select the desired locking, direction by switching the locking direction of the ratchet device.

The tensioning apparatus according to the invention thus includes a ratchet device with a ratchet securing mechanism which can be switched relative to its locking direction and a tensioning ratchet mechanism whose locking direction is also switchable.

The ratchet securing mechanism may include two mutually one-armed levers which act on the externally toothed ratchet wheel. Only one of the two levers is in engagement with the teeth at any one time, while the other remains in an inactive position. In this way, the switchability of the locking direction of the ratchet securing mechanism is realized. The two locking levers may be combined into a single locking element, such as a two-armed double pawl which can be pivoted between the two locking positions.

The ratchet securing mechanism preferably includes a press-on slide which is guided in a V-shaped slide guide groove and which switches the double.

In addition to the ratchet wheel and the ratchet securing mechanism, the ratchet device includes a tensioning ratchet mechanism at the tensioning lever. The structural configuration of the tensioning ratchet mechanism corresponds in part to the structural configuration of the ratchet securing mechanism at the frame housing. On the one hand, this makes possible the use of the same ratchet wheel for both ratchet mechanisms. On the other hand, the use of identical components is of a manufacturing advantage. Finally, this structure permits the use of symmetrical tooth shapes at the ratchet wheel.

Advantageously the tensioning ratchet mechanism can also be manually switched.

The tensioning ratchet mechanism preferably includes a double catch, the position of which can be switched to change the tensioning direction of the tensioning ratchet mechanism.

A drive connection is preferably provided between the tensioning ratchet mechanism and the ratchet securing mechanism in such a manner that their tensioning and locking directions coincide with one another in each case. This has the advantage of synchronizing the switching and of the respectively effective locking direction of the ratchet securing mechanism and of the tensioning ratchet mechanism.

A symmetrical configuration of the overall structure is preferable, including a tensioning ratchet mechanism active on both sides and a pair of ratchet securing mechanism for transferring particularly high tensioning moments.

DESCRIPTION OF THE PREFERRED EMBODIMENT

Seen in longitudinal direction 2, the frame 1 of a tensioning apparatus in accordance with the present invention has an essentially U-shaped cross section with fork-like free ends 3 and 9. At the free rear end 3, a fastening pin 4 connects the side walls 5, 5' of the frame 1 in a direction transverse (=transverse direction 6) to longitudinal direction 2. Fastening pin 4 serves to fasten the fixed end 7 of a lashing strap 8 which, for this purpose, is looped around fastening pin 4.

The front free end 9 is provided with a transverse metal connecting sheet 10 between side walls 5, 5' in order to stabilize frame 1 and act as a reinforcement in the manner of a transverse web. Approximately midway between the front free end 9 and free rear end 3, a transverse metal connecting sheet 60 connects side walls 5, 5' with one another. Transverse metal connecting sheet 60 is made from a punched bent member which is made in one piece with side walls 5, 5'. In longitudinal direction 2, next to transverse metal connecting sheet 10, a wind-up spindle 11 is rotatably mounted between side walls 5, 5'. Wind-up spindle 11 is diametrally penetrated over its entire length (transverse direction 6) by a strap receiving slot 12. The length of the slot corresponds to the width of the strap. Wind-up spindle 11 extends through openings in the side walls 5, 5' of frame 1. The regions of wind-up spindle 11 projecting beyond side walls 5, 5' are diametrally penetrated by bearing pins 13 which secure the axial position of wind-up spindle 11. Two ratchet wheels 14, 14' having openings that are configured to provide a form-locking connection to spindle 11, which constitutes their axis of rotation relative to frame 1. Ratchet wheels 14, 14' are provided on their circumferences with radially outwardly projecting ratchet teeth 15. Ratchet teeth 15 have a symmetrical, trapezoidal cross section which extends in transverse direction 6. Thus they project in radial direction 16 from the circumference of ratchet wheels 14, 14' in the manner of the teeth of a spur gear.

Wind-up spindle 11 additionally passes through the fork ends of tensioning lever 17 also in the manner of a bearing axis. In transverse direction 6, a ratchet wheel 14, 14' lies between the exterior faces of side walls 5, 5' of frame 1 and the interior faces of the side walls 18, 18' of the tensioning lever. Bearing pins 13 lie externally on both sides against the exterior faces of tensioning lever side walls 18, 18' and thus secure in a form-locking manner the axial position of wind-up spindle 10 relative to frame 1 and tensioning lever 17.

The gripping end 19 of tensioning lever 17, which faces away from the free end through which passes the wind-up spindle 11, is configured as an operating handle 20 which, as a cylindrical body, connects the tensioning lever side walls 18, 18' with one another in the manner of a transverse web.

A double pawl 21, 21' is mounted to frame housing 1 in longitudinal direction 2 between wind-up spindle 11 and fastening pin 4 on the exterior face of each side wall 5, 5'. Both double pawls 21, 21' are penetrated by a pawl shaft 22 and are mounted at frame 1 so as to be pivotal about that shaft. Starting from pawl shaft 22, seen in the direction toward ratchet wheel 14, 14', an upper pawl arm 23 and a lower pawl arm 24 project approximately in the manner of two spread-apart arms, like teeth out of double pawl 21, 21'. Double pawls 21, 21' are included in ratchet securing mechanisms 70 which cooperate with ratchet wheels 14, 14'. An essentially V-shaped switching recess 26 is provided at the rear face 25 of each double pawl 21, 21' where it faces away from ratchet wheel 14, 14'. The rear face 25 of double pawl 21, 21' is followed in longitudinal direction 2 by an essentially V-shaped slide guide groove 27 which is provided in each side wall 5, 5' of the frame. In transverse direction 6, a press-on slide 28 extends through guide grooves 27. By way of a tab 63 that projects from transverse metal connecting sheet 60 at an angle, press-on slide 28 is supported opposite to its escape direction radially outwardly at frame 1 at a spring element 29 which acts as a compression spring.

The ratchet securing mechanisms 70 operate as follows: press-on slide 28 is selectively pivoted into one of the two V-arms of a generally x-shaped slide guide groove 27 and, charged by spring element 29, presses permanently against one of the two side arms of switching recess 26. Pressure on one of the side arms of switching recess 26 causes either the upper pawl arm 23 or the lower pawl arm 24 of double pawl 21, 21' to be pivoted into the tooth arrangement (=teeth 15, 15') of ratchet wheel 14.

Approximately in the middle between operating handle 20 and wind-up spindle 11, the side walls 18, 18' of the tensioning lever are fixed to one another by means of a transverse yoke 30. Transverse yoke 30 is penetrated outwardly in longitudinal direction 2 by the free ends of two control slides 31, 31' which extend parallel to the side walls 18, 18' of the tensioning lever. These free ends are connected with one another by a bar-like handle 32 extending in transverse direction 6. Control slides 31, 31' are provided with facing fixing projections 33, 33' which project inwardly in transverse direction 6 into the space between tensioning lever side walls 18, 18'. With the aid of these fixing projections, control slides 31, 31' are charged by way of spring packets 34, 34' at transverse yoke 30 in the direction toward wind-up spindle 11.

At their ends facing operating handle 20, control slides 31, 31' extend in a straight line initially inwardly and parallel to the interior faces of the side walls 18, 18' of the tensioning lever. The latter are bent inwardly in the region of a constriction 35, 35'. There control slides 31, 31' pass through them in the region of openings 52 which permit a large amount of play. During their further course, control slides 31, 31' extend in longitudinal direction 2 toward the exterior of wind-up spindle 11 parallel to the exterior faces of tensioning lever side walls 18, 18'. Inwardly projecting control pins 37, 37' extend parallel to wind-up spindle 11 from the free ends facing away from control handle 32 and are oriented toward wind-up spindle 11. The projecting ends of control pins 37, 37' each penetrate a U-shaped control groove 36 in tensioning lever side walls 18, 18' and project inwardly at their ends beyond tensioning lever side walls 18, 18'. The two U-arms 57 of control groove 36 are oriented in the approximate direction of wind-up spindle 11 toward the spindle end of tensioning lever 17. In the region of the U-shaped control grooves 36, double catches 38, 38' which flank the interior faces of tensioning lever side walls 18, 18' are supported at the interior faces so as to be pivotal about shafts 53 that are oriented parallel to wind-up spindle 11. The pivoted position of double catches 38, 38' is determined by the position of control pins 37, 37' within the U-shaped control groove 36. The position of control pins 37, 37', in turn, within control groove 36 is determined by control slides 31, 31', that is, ultimately by control handle 32. Double catches 38, 38' are included in tensioning ratchet mechanisms 80.

Similar to double pawls 21, 21' in their effect on ratchet wheel 14, 14', double catches 38, 38' are each provided, at their side facing ratchet wheel 14, 14' with an upper catch arm 39 and a lower catch arm 40 which appear as arms that are radially spread apart relative to shafts 53 and project in the direction toward ratchet wheel 14, 14'. On each catch rear face 41 facing away from catch arms 39, 40, there is shaped in an essentially V-shaped control recess 42. The spread-apart V-arm ends 58, 59 of control recess 42 are connected with one another by a connecting groove 43.

The double catch 38, 38' operates as follows to reverse the tensioning direction:

By moving control slide 31, 31' by means of a pulling movement at handle 32 in the direction toward operating handle 20, control pin 37 is positively guided in control groove 36 and positioned in its respectively controlling desired position in arm end 58 or 59 relative to double catch 38. The same inevitably also applies for the other control pin 37' relative to the other double catch 38'. The control function acting on double catches 38, 38' is thus converted by control pins 37, 37' and by way of the V-shaped control recess 42 and its transverse arm 55, respectively, into a desired rotational position of double catch 38, 38' relative to ratchet wheel 14, 14'. The two arms 58, 59 of the V form a gusset 54 which, similar to an arrowhead, faces the periphery of ratchet wheel 14, 14'.

Lateral pressure onto the front ends of control slides 31, 31' causes their control pins 37 in transverse arm 55 of control groove 36 to be moved in the direction toward their other U-arm 58 or 59. Thus control pin 37, 37' inevitably also moves within connecting groove 43 of double catch 38, 38' into the previously inactive V-arm of control recess 42 up to the inner end of the arm in the region of gusset 54. This motion sequence occurs as a result of the release of handle 32 under the driving action of the permanent pressure of spring packets 34, 34'. This causes control pin 37, 37', guided by the selected U-arm of control groove 36 to inevitably slide into the associated V-arm 58, 59 of control recess 42 and to dip into its end on the side of the gusset. This pivots double catch 38, 38' in such a manner that the previously active catch arm 39, 40 comes out of engagement with the tooth arrangement (=teeth 15, 15') of ratchet wheel 14, 14' and the previously inactive catch arm 39, 40 goes into engagement with the tooth arrangement (=teeth 15, 15'). This completes, in principle, the reversal of the direction of rotation of the tensioning ratchet mechanism 80.

A positioning slide 45 which is connected for movement with control slides 31, 31' and is supported by way of compression spring 44 at transverse yoke 30 is disposed next to the plane defined by control slides 31, 31' in a motion plane approximately parallel thereto. The direction of the pressure of compression spring 44 acts analogously to the direction of the pressure of spring packet 34, 34' in the direction toward ratchet wheels 14, 14'. If tensioning lever 17 is now pivoted about wind-up spindle 11 in a pivoting direction 46 oriented away from frame housing 1, a maximum opening angle α of approximately 90° may be realized between pivot arm 17 and frame 1. The apex of angle α lies approximately in the center axis of wind-up spindle 11 and its magnitude is determined by two stops 47A and 47B provided by housing 1. At the end of this pivoting movement, positioning slide 45 abuts at pivot stops 47A and 47B in such a manner that the tensioning lever 17 connected with slide 45 is prevented from performing any further pivoting movement. In order to tension lashing strap 8 until it reaches its desired tension, it is merely necessary to repeat this described back and forth movement of tensioning lever 17 sufficiently often, without it being necessary for the operator to pay particular attention to it. The rotary position transferred by ratchet wheel 14, 14' to wind-up spindle 11 when positioning slide 45 abuts at pivot stops 47A and 47B, that is, the ultimate lashing position reached in each case, is secured and thus automatically maintained by the ratchet securing mechanisms 70 disposed at frame housing 1 and described earlier. To accomplish this, double pawl 21, 21' must first be moved to the locking position associated with the selected lashing direction by the above-described control of its press-on slide 28. The pawl arm 23 or 24 associated with this locking direction engages lockingly into the ratchet wheel tooth arrangement (=teeth 15, 15').

Figure 8:
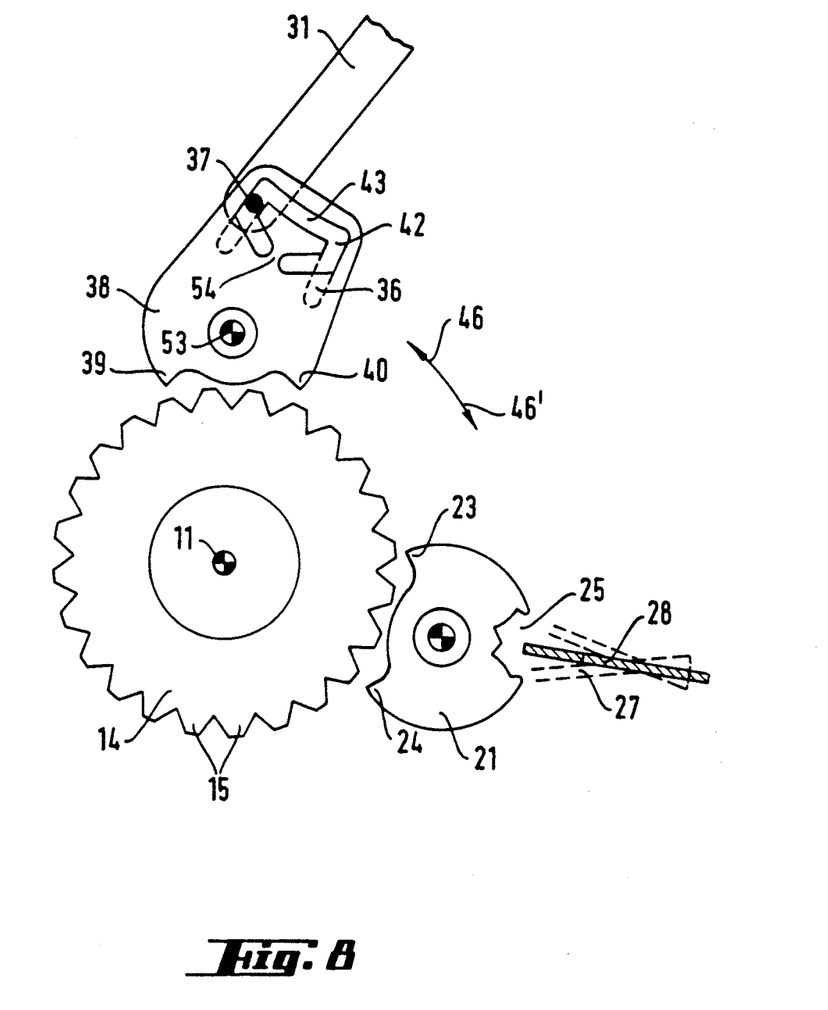
FIG. 8 is a schematic basic illustration of the ratchet securing mechanism and of the tensioning ratchet mechanism in the free-wheeling position.

The procedure to release the taken-up and thus secured final lashing position of wind-up spindle 11 is the following:

A pulling movement at handle 32 in the direction toward operating handle 20, causes positioning slide 45 to be retracted from its abutment position to the extent that it goes out of contact with pivot stop 47A. This permits pivot arm 17 to be further pivoted in pivoting direction 46. Thus, the end of positioning slide 45 facing ratchet wheel 14, 14' initially slides onto the cam-like periphery 61 of side wall 5, 5' of frame housing 1 until it finally abuts at projections 48 which are provided on frame housing 1 and engages in a detent groove 62. The thus performed pivoting movement of pivot arm 17 causes positioning slide 45 to move the double catch 38, 38' into its neutral position (FIG. 8). This causes positioning slide 45 to overcome the pressure of compression spring 44 which presses it against release cam 61 and urges it into the detent groove 62 at its end. Due to the kinematic connection of positioning slide 45 with control slide 31, 31' for joint retraction as a result of the pulling motion at handle 32, control pin 37, 37' is returned out of the U-arm into the transverse arm 55 of the control groove 36 of tensioning lever 17. This has the result that catch arms 39, 40 of double catch 38, 38' are out of engagement with the tooth arrangement (=teeth 15, 15'). In this position, double catch 38, 38' takes on a center pivot position relative to ratchet wheels 14, 14'.

At the end of tensioning lever 17 that is penetrated by wind-up spindle 11, a cam 49 is provided which faces away from operating handle 20. If tensioning lever 17 is pivoted in rotation direction 46 to beyond pivot stop 47, cam 49 takes on a rotated and charging position which has such an effect on pawl arms 23, 24 that they are pivoted out of the tooth arrangement (=teeth 15, 15'). Now wind-up spindle 11 is freely rotatable to release lashing strap 8. The ratchet securing mechanism is fully inactivated.

Frame 1 has detent recesses 51 adjacent one end of the pivot path traversed by tensioning lever 17, in addition to the detent recesses 62. A pulling movement at handle 32 against the pressure of compression spring 44 and spring packet 34, 34' permits positioning slide 45, which is coupled for movement in this direction with control slide 31, 31', to be retracted in such a way that it is charged by compression spring 44 and engages in detent recesses 51 and 62, respectively, of frame 1. This arrests tensioning lever 17 in its extreme open position as well as in its extreme closed position (=rest position).

Figure 1:
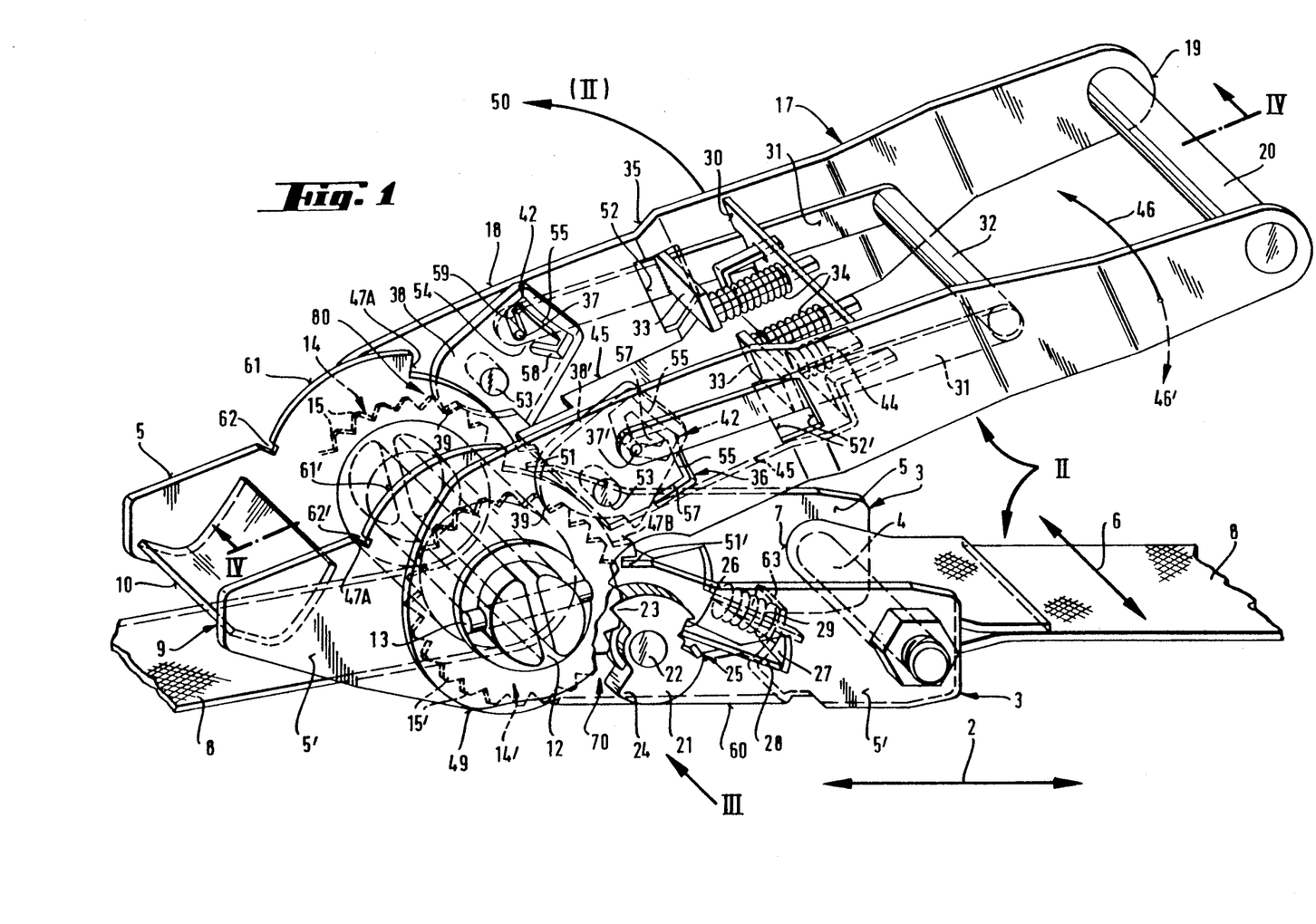
FIG. 1 is a perspective view of the tensioning apparatus of the invention in the center position seen from one side from the front and from the top.
Figure 2:
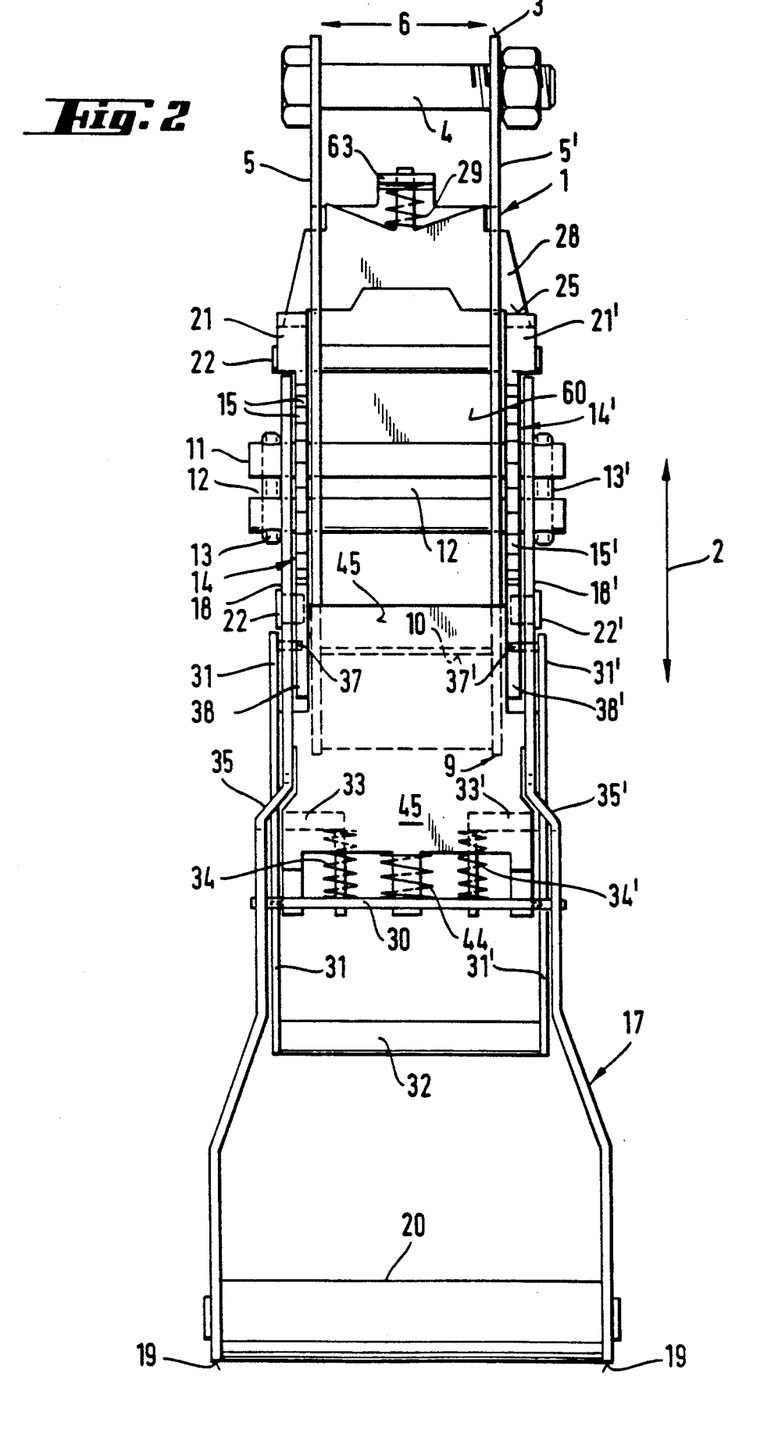
FIG. 2 is a top view of the tensioning ratchet approximately in the direction of arrow II in FIG. 1, with tensioning lever and frame housing spaced apart to the maximum extent in direction II of FIG. 1, seen from the top (II)
Figure 3:
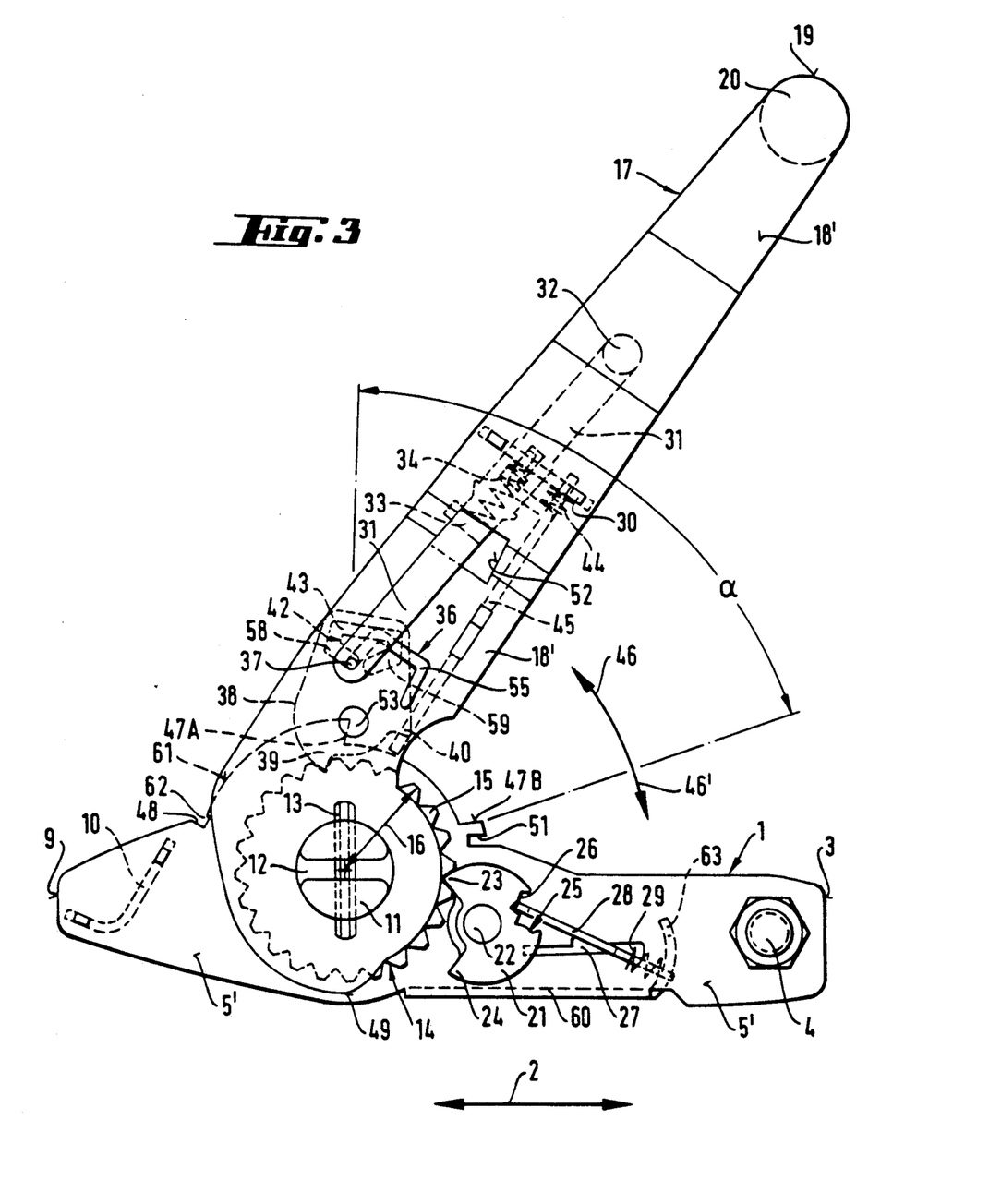
FIG. 3 is a side view corresponding to arrow III of FIG. 1, again in a center pivot position between the rest position and the 90° position.
Figure 4:
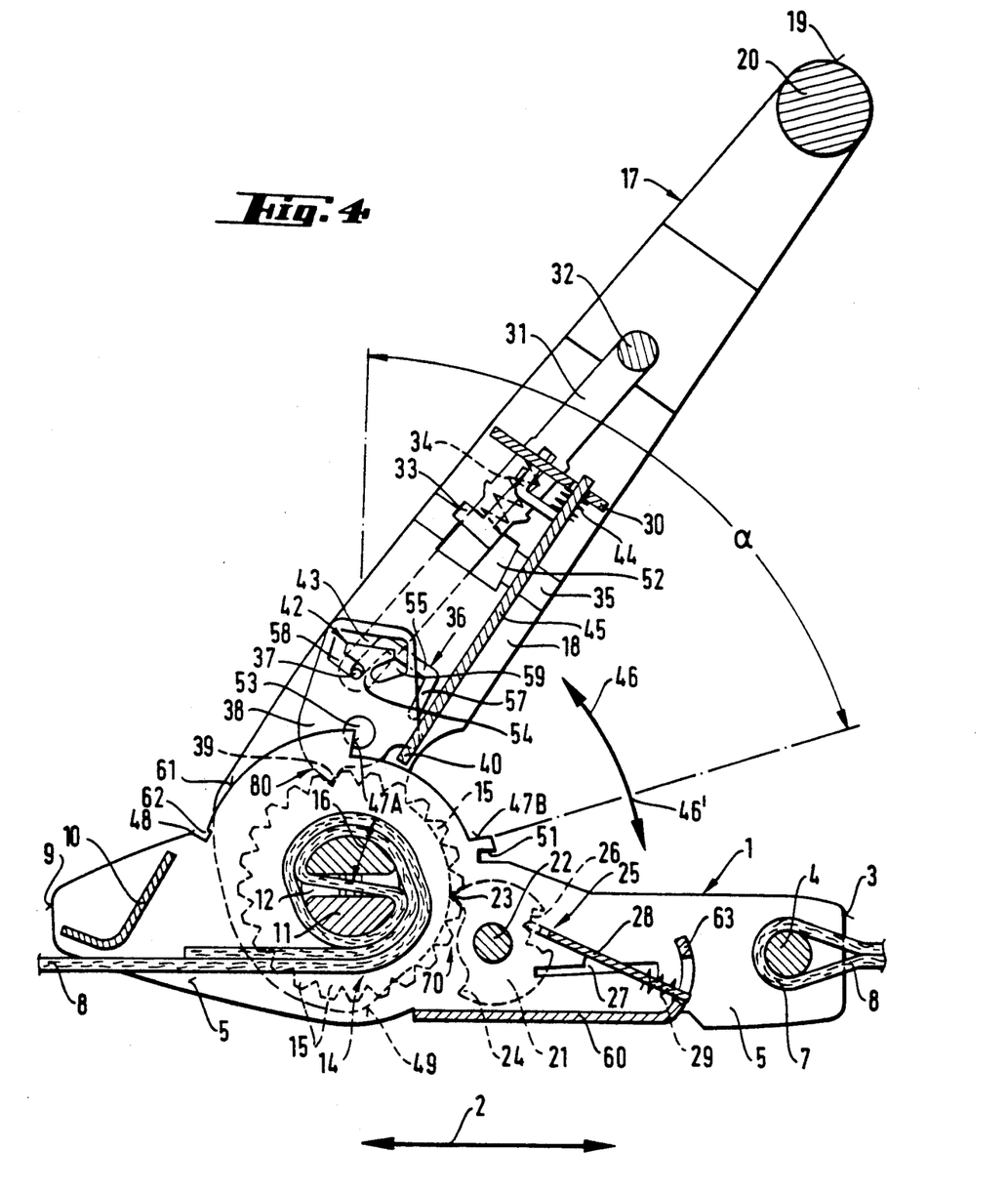
FIG. 4 is a sectional view in the section plane indicated by section line IV—IV of FIG. 1 of the same center pivot position as in FIG. 3.
Figure 5:
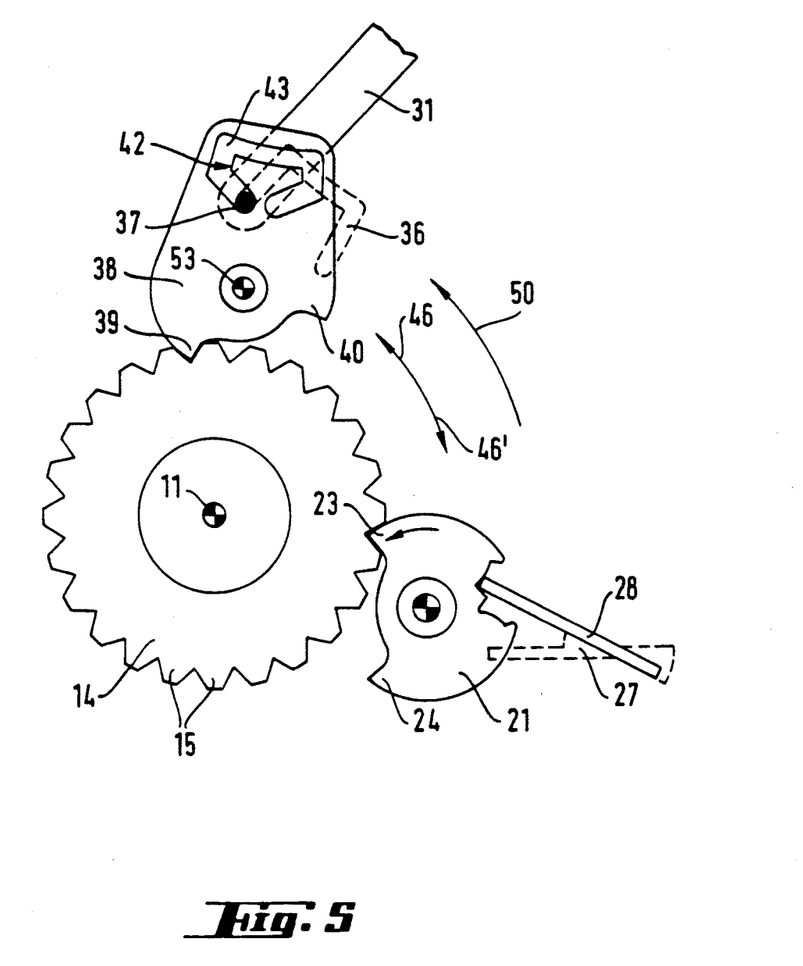
FIG. 5 is a schematic basic illustration corresponding to the setting of FIGS. 3 and 4 of the ratchet securing mechanism and the tensioning ratchet mechanism with the tensioning direction oriented away from the frame in the pivoting direction of the tensioning lever.

For the sake of clarity, the operation of the tensioning apparatus shall be described once more with respect to its elements that produce the essential function positions:

FIG. 5 shows the use as push ratchet, in which case the torque is generated by a rotary movement in pivoting direction 46 away from frame 1. Thus tensioning takes place counterclockwise in tensioning direction 50. In this case, the upper catch arm 39 of double catch 38, 38' of tensioning ratchet mechanism 80 and the upper pawl arm 23 of double pawl 21, 21' of the ratchet securing mechanism 70 are in engagement with the tooth arrangement (=teeth 15, 15'). Rotation of ratchet wheel 14, 14' takes place in that catch 38 is driven by tensioning lever 17 (not shown here) in tensioning direction 50 as a result of the engagement of the upper catch arm 39 in the tooth arrangement (=teeth 15, 15') which constitutes a lock in this direction. During the no-load stroke in the direction opposite to tensioning direction 50, that is, in clockwise direction 46', the upper catch arm 39 slides freely over teeth 15, 15'.

Figure 6:
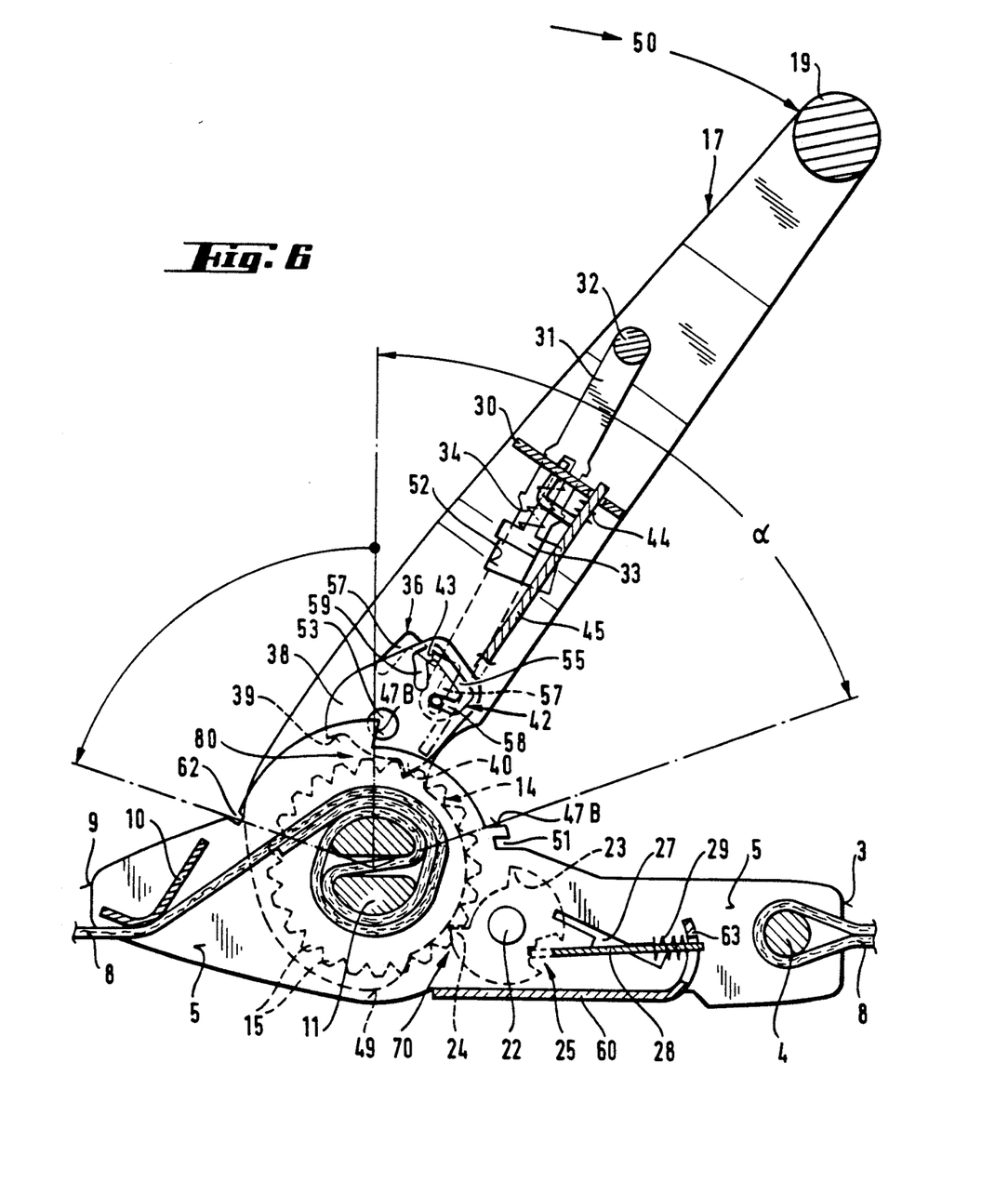
FIG. 6 is a sectional view according to FIG. 3, in which, however, the ratchet device is set for a tensioning direction oriented toward the frame.
Figure 7:
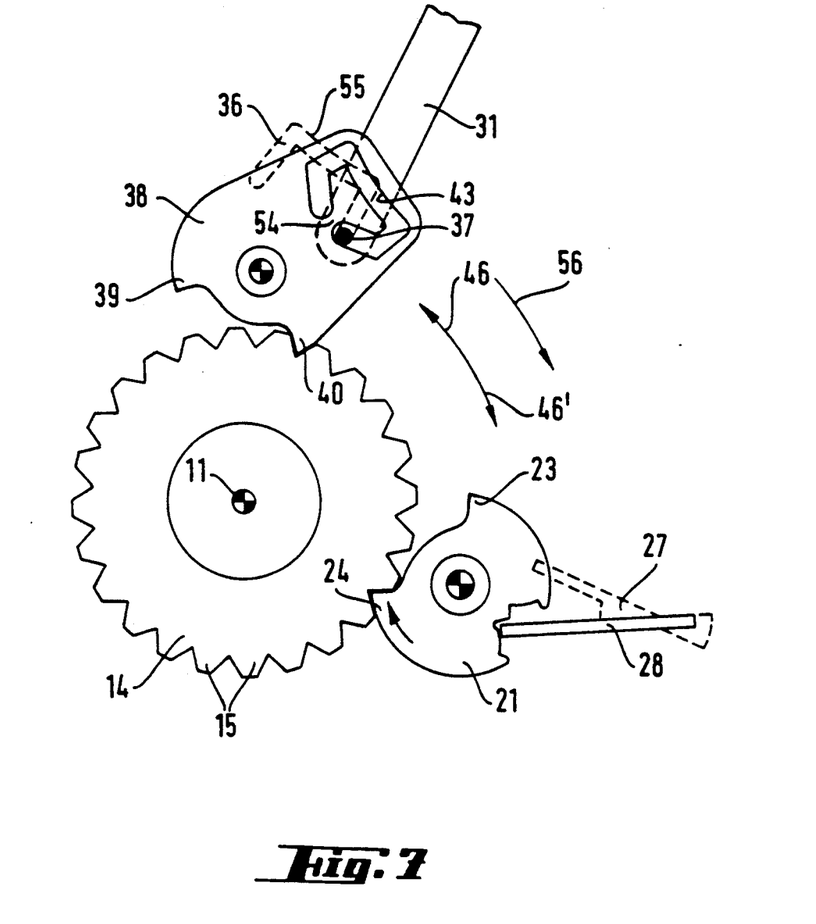
FIG. 7 is a schematic basic illustration of the ratchet securing mechanism and the tensioning ratchet mechanism with the tensioning direction of the tensioning lever of FIG. 6 being oriented toward the frame.

FIGS. 6 and 7 show the use as pull ratchet with a pivoting movement 46' of tensioning lever 17 toward frame 1. The tensioning direction 56 is in clockwise direction 46', with the lower catch arm 40 of the double catch 38, 38' being driven by tensioning lever 17 (not shown) and the lower pawl arm 24 of the double pawl 21, 21' rotationally mounted at frame 1 being in engagement with ratchet wheels 14, 14' or, more precisely, with their ratchet wheel teeth 15, 15'. This engagement 24/14 locks ratchet wheels 14, 14' against counterclockwise reverse rotation (FIG. 7). During the rotational movement in tensioning direction 56 toward frame 1, the lower catch arm 40 is in firm engagement with a tooth 15, 15'. During the return stroke in pivoting direction 46, in the direction opposite to tensioning direction 56, the lower catch arm 40 slides freely over teeth 15, 15'.

FIG. 8 is a schematic representation of the unengaged position of the tensioning apparatus. Neither the lower pawl arm 24 nor the upper pawl arm 23 nor the lower catch arm 40 nor the upper catch arm 39 are in engagement with the ratchet wheels or ratchet wheel teeth (15, 15'). The pawl arms 23, 24 of double pawl 21, 21' are held out of engagement by the cam 49 of tensioning lever 17. The catch arms 39, 40 of double catch 38, 38' are held out of engagement with ratchet wheel 14, 14' by the end face of positioning slide 45 being in contact with release cam 61 or by engagement in the detent groove 62 of frame 1. For this purpose, handle 32 is pulled in the direction toward operating handle 20. The described coupling of positioning slide 45 for movement with control slide 31, 31' causes the catch arms 39, 40 of double catch 38, 38' to take on their free-wheeling position.

To summarize once more:

The tensioning apparatus includes two symmetrically disposed ratchet devices, each including a ratchet wheel (14 or 14'), a ratchet securing mechanism 70 which cooperates with the ratchet wheel and which includes a double pawl 21, 21' and the tensioning ratchet mechanism 80 defined which cooperates with the ratchet wheel which includes a double catch (38 or 38').

I claim:

1. A tensioning apparatus for a lashing strap having a fixed end and a loose end, comprising:

a frame having side walls;

means for attaching the fixed end of the lashing strap to the frame;

a spindle for winding up the lashing strap from its loose end, the spindle being mounted on the side walls of the frame and being rotatable in clockwise and counterclockwise directions;

a tensioning lever pivotally mounted on the spindle; and a ratchet device to rotate the spindle when the tensioning lever is manually pivoted back and forth, the ratchet device including ratchet securing mechanism means for selectively preventing the spindle from rotating in one of the clockwise and counterclockwise directions, wherein the ratchet securing mechanism means comprises manually operable means for switching which direction of spindle rotation is to be prevented.

2. The tensioning apparatus of claim 1, wherein the ratchet device further comprises an externally toothed ratchet wheel that is attached to the spindle, and wherein the ratchet securing mechanism means further comprises a locking member that is mounted on the frame and that is engaged by the means for switching, the locking member being movable between a locking position in which the locking member engages a tooth of the ratchet wheel so as to keep the ratchet wheel from rotating and a slide-over position in which the locking member is displaced from its locking position by a distance which permits the locking member to slide over the apex of a tooth.

3. The tensioning apparatus of claim 1, wherein the ratchet device further comprises an externally toothed ratchet wheel which is fixed to the spindle and which cooperates with the ratchet securing mechanism means, and tensioning ratchet mechanism means for cooperating with the ratchet wheel to rotate the spindle in the other of the clockwise and counterclockwise directions when the tensioning lever is manually pivoted back and forth, the tensioning ratchet mechanism means being mounted on the tensioning lever.

4. The tensioning apparatus of claim 3, wherein the tensioning ratchet mechanism means comprises manually switchable means for selecting the direction in which the spindle is to be rotated.

5. The tensioning apparatus of claim 3, wherein the tensioning ratchet mechanism means comprises a catch element mounted on the tensioning lever, the catch element being movable between a catch position in which the catch element engages a tooth of the ratchet wheel so as to keep the catch element from rotating with respect to the ratchet wheel and a slide-over position in which the catch element is displaced from its catch position by a distance which permits the catch element to slide over the apex of a tooth.

6. The tensioning apparatus of claim 3, wherein the tensioning ratchet mechanism means comprises an element that is pivotally mounted on the tensioning lever at a position to engage the ratchet wheel.

7. The tensioning apparatus of claim 3, wherein the tensioning ratchet mechanism means comprises a two-armed double catch element that is pivotally mounted on the tensioning lever.

8. The tensioning apparatus of claim 7, wherein the tensioning ratchet mechanism means further comprises switching means for selectively pivoting one of the arms of the double catch element into a catch position and for holding it there.

9. The tensioning apparatus of claim 8, wherein the switching means comprises a control slide mounted on the tensioning lever, and spring means for biasing the control slide toward the ratchet wheel.

10. The tensioning apparatus of claim 8, wherein the double catch element is pivotal about a pivot axis, and wherein the arms of the double catch element are symmetrical with respect to a plane passing through the pivot axis.

11. The tensioning apparatus of claim 8, wherein the arms of the double catch element have exterior flanks and interior flanks, the interior flanks of the arms facing one another, and wherein the arms of the double catch element are configured so that their exterior flanks catch the ratchet wheel teeth and their interior flanks slide over the ratchet wheel teeth.

12. The tensioning apparatus of claim 3, wherein the tensioning ratchet mechanism means and the ratchet securing mechanism means have tensioning and locking directions which coincide with each other.

13. The tensioning apparatus of claim 3, wherein the ratchet wheel is disposed adjacent one of the side walls of the frame, and further comprising another ratchet wheel which is fixed to the spindle and which is disposed adjacent the other side wall of the frame, and another ratchet securing mechanism means and another tensioning ratchet mechanism means to cooperate with the another ratchet wheel.

14. The tensioning apparatus of claim 3, wherein the tensioning apparatus is substantially symmetrical with respect to a center plane which is perpendicular to the spindle and which bisects the spindle.

15. A tensioning apparatus for a lashing strap having a fixed end and a loose end, comprising:

a frame having side walls;

means for attaching the fixed end of the lashing strap to the frame;

a spindle for winding up the lashing strap from its loose end, the spindle being mounted on the side walls of the frame and being rotatable in clockwise and counterclockwise directions;

a tensioning lever pivotally mounted on the spindle; and a ratchet device to rotate the spindle when the tensioning lever is manually pivoted back and forth, the ratchet device including ratchet securing mechanism means for selectively preventing the spindle from rotating in one of the clockwise and counterclockwise directions, wherein the ratchet device comprises an externally toothed ratchet wheel fitted to the spindle, and wherein the ratchet securing mechanism means comprises a two-armed double pawl that is pivotally mounted on the frame to cooperate with the ratchet wheel, the double pawl being pivotal between two locking positions.

16. The tensioning apparatus of claim 15, wherein the ratchet securing mechanism means further comprises a switching element movably mounted on the frame for selectively pivoting one of the arms of the double pawl to its locking position and holding it there.

17. The tensioning apparatus of claim 16, wherein the ratchet securing mechanism means further comprises spring means for biasing the switching element against the double pawl.

18. The tensioning apparatus of claim 17, wherein the frame has a generally X-shaped opening, and wherein the switching element is a slide member that extends through the opening.

19. The tensioning apparatus of claim 15, wherein the double pawl is pivotal about a pivot axis, and wherein the two arms of the double pawl are symmetrical with respect to a plane passing through the pivot axis.

20. The tensioning apparatus of claim 19, wherein the teeth of the ratchet wheel have a symmetrical tooth shape, wherein the arms of the double pawl have exterior flanks and interior flanks, the interior flanks of the arms facing one another, and wherein the arms of the double pawl are configured so that their exterior flanks lock against the ratchet wheel teeth and their interior flanks slide over the ratchet wheel teeth.

21. The tensioning apparatus of claim 20, wherein the double pawl has a front portion which faces the ratchet wheel and a rear portion which faces away from the ratchet wheel, the arms of the double pawl being provided on the front portion, wherein the rear portion of the double pawl has a generally V-shaped switching recess with facing flanks, and wherein the ratchet securing mechanism means further comprises a spring, and a switching element which is movably mounted on the frame and which is pressed by the spring against one of the flanks of the switching recess depending on whether the spindle is to be prevented from rotating clockwise or counterclockwise.

22. A tensioning apparatus for a lashing strap having a fixed end and a loose end, comprising:
a frame having side walls;
means for attaching the fixed end of the lashing strap to the frame;
a spindle for winding up the lashing strap from its loose end, the spindle being mounted on the side walls of the frame and being rotatable in clockwise and counterclockwise directions;
a tensioning lever pivotally mounted on the spindle; and
a ratchet device to rotate the spindle when the tensioning lever is manually pivoted back and forth, the ratchet device including ratchet securing mechanism means for selectively preventing the spindle from rotating in one of the clockwise and counterclockwise directions, an externally toothed ratchet wheel which is fixed to the spindle and which cooperates with the ratchet securing mechanism means, and tensioning ratchet mechanism means for cooperating with the ratchet wheel to rotate the spindle in the other of the clockwise and counterclockwise directions when the tensioning lever is manually pivoted back and forth, the tensioning ratchet mechanism means being mounted on the tensioning lever,
wherein the tensioning ratchet mechanism means comprises a two-armed double catch element that is pivotally mounted on the tensioning lever, and switching means for selectively pivoting one of the arms of the double catch element into a catch position and for holding it there,
wherein the switching means comprises a control slide mounted on the tensioning lever, and spring means for biasing the control slide toward the ratchet wheel,
wherein the tensioning lever has a generally U-shaped control groove, and
wherein the switching means further comprises a projection which is attached to the control slide and which extends through the generally U-shaped groove to engage the double catch element.

23. The tensioning apparatus of claim 22, wherein the ratchet securing mechanism means comprises manually operable means for switching which direction of spindle rotation is to be prevented.

24. The tensioning apparatus of claim 22, wherein the ratchet securing mechanism means comprises a locking member pivotally mounted on the frame to cooperate with the ratchet wheel.

25. A tensioning apparatus for a lashing strap having a fixed end and a loose end, comprising:
a frame having side walls;
means for attaching the fixed end of the lashing strap to the frame;
a spindle for winding up the lashing strap from its loose end, the spindle being mounted on the side walls of the frame and being rotatable in clockwise and counterclockwise directions;
a tensioning lever pivotally mounted on the spindle, the tensioning lever having a generally U-shaped groove; and
a ratchet device to rotate the spindle when the tensioning lever is manually pivoted back and forth, the ratchet device including ratchet securing mechanism means for selectively preventing the spindle from rotating in one of the clockwise and counterclockwise directions, an externally toothed ratchet wheel which is fixed to the spindle and which cooperates with the ratchet securing mechanism means, and tensioning ratchet mechanism means for cooperating with the ratchet wheel to rotate the spindle in the other of the clockwise and counterclockwise directions when the tensioning lever is manually pivoted back and forth, the tensioning ratchet mechanism means being mounted on the tensioning lever,
wherein the tensioning ratchet mechanism means comprises
a double catch element pivotally mounted on the tensioning lever, the double catch element having a front portion which faces the ratchet wheel and a rear portion which faces away from the ratchet wheel, the front portion of the double catch element having two arms and the rear portion of the double catch element having a control recess which includes a pair of recess arms that are directed toward one another,
a spring, and
a control slide which is biased toward the ratchet wheel by the spring, the control slide having a projection which extends through the U-shaped groove in the tensioning lever and into the control recess of the double catch element to selectively pivot one of the arms of the double catch element into engagement with the ratchet wheel.

26. The tensioning apparatus of claim 25, wherein the control recess additionally has a connecting portion which connects the pair of recess arms.

27. The tensioning apparatus of claim 26, wherein the control slide has an end facing away from the ratchet wheel, and further comprising a handle connected to the control slide at its end facing away from the ratchet wheel, the handle being manually operable to shift both arms of the double catch element out of engagement with the ratchet wheel.

28. The tensioning apparatus of claim 27, wherein the control slide is mounted on the tensioning lever in such a manner that the end of the control slide facing away from the ratchet wheel pivots about the spindle when the tensioning lever is pivoted back and forth.

29. The tensioning apparatus of claim 27, wherein the frame has a pivot stop, and further comprising a positioning slide which is biased toward the spindle, the positioning slide engaging the pivot stop during back and forth pivoting of the tensioning lever to limit the angular extent of the back and forth pivoting, the positioning slide being operationally connected to the control slide in such a manner that the positioning slide is lifted over the pivot stop when the handle is manually operated to shift the arms of the double catch element out of engagement with the ratchet wheel.

30. The tensioning apparatus of claim 29, wherein the frame has detent recesses to receive the positioning slide when the frame and the tensioning lever are disposed at predetermined angular positions.

31. The tensioning apparatus of claim 30, wherein one of the predetermined angular positions is a fully open angular position, wherein the ratchet securing mechanism means comprises a two-armed double pawl which is pivotally mounted on the frame, and means movably mounted on the frame for selectively pivoting one of the arms of the double pawl into engagement with the ratchet wheel and holding it there, and wherein the tensioning lever has a cam which displaces both arms of the double pawl from the ratchet wheel when the frame and the tensioning lever are disposed at the fully open angular position.

* * * * *